July 12, 1938. C. H. RAMSEY 2,123,744
TAKE-UP MECHANISM
Filed Jan. 21, 1937 2 Sheets-Sheet 1
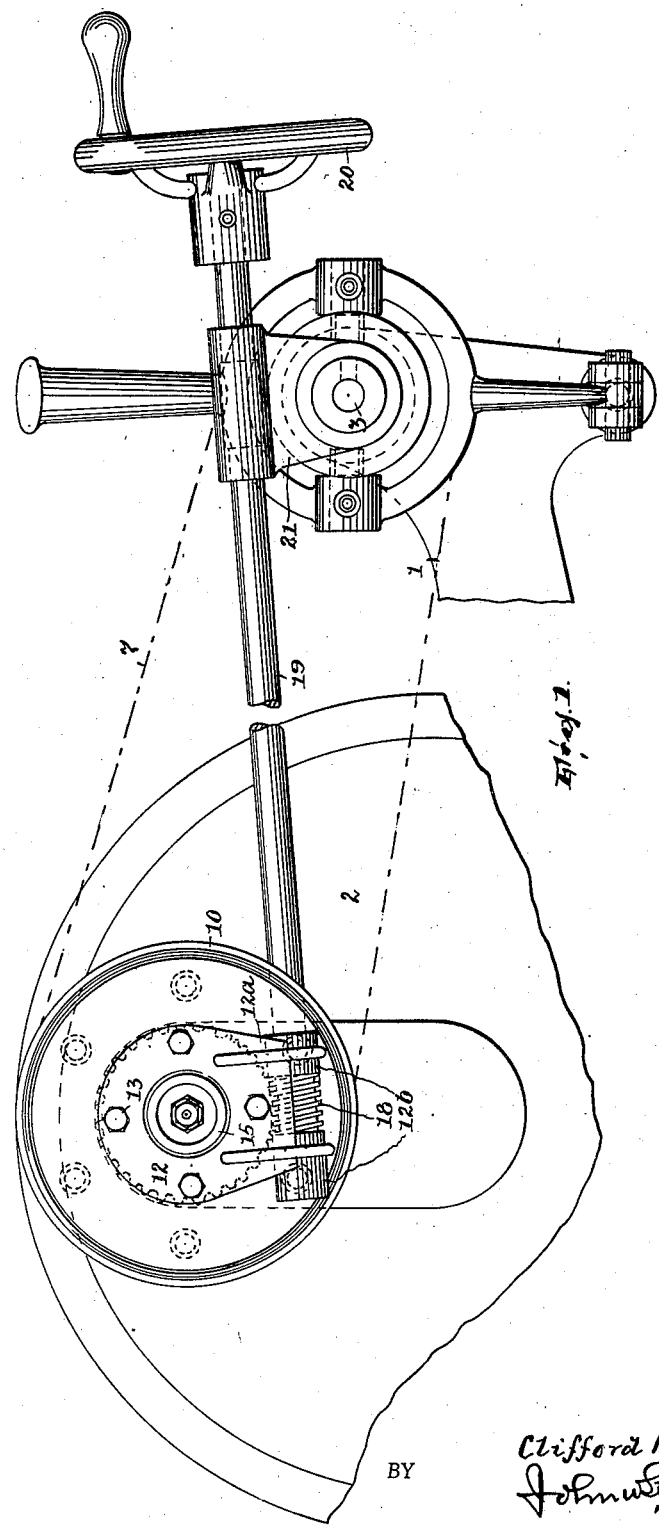
INVENTOR,
Clifford H. Ramsey
John W. Steward
ATTORNEY.

July 12, 1938.   C. H. RAMSEY   2,123,744
TAKE-UP MECHANISM
Filed Jan. 21, 1937   2 Sheets-Sheet 2
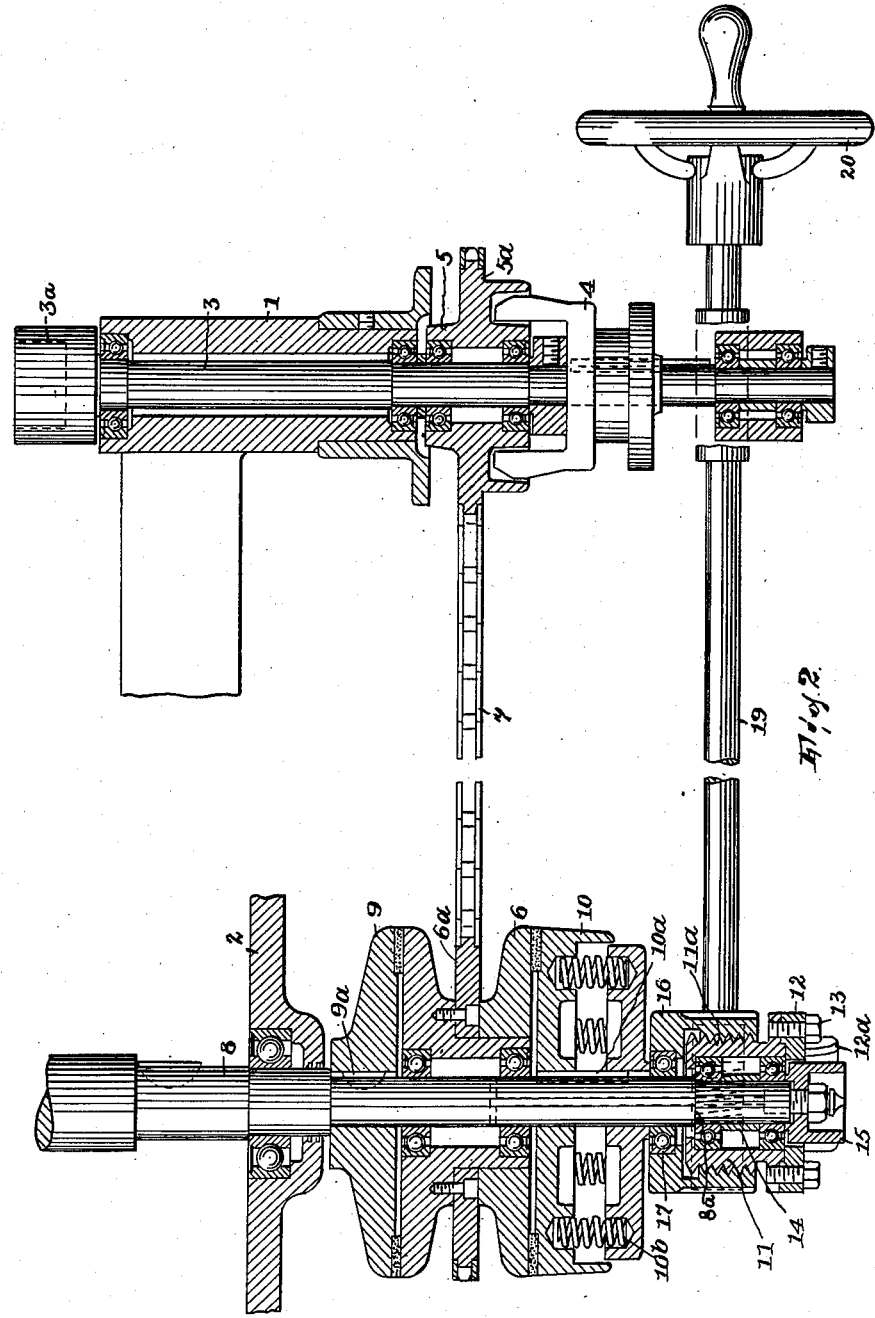
INVENTOR,
Clifford H. Ramsey,
BY
John W. Steward
ATTORNEY.

Patented July 12, 1938

2,123,744

UNITED STATES PATENT OFFICE 2,123,744

TAKE-UP MECHANISM

Clifford H. Ramsey, Glen Rock, N. J.

Application January 21, 1937, Serial No. 121,716

2 Claims. (Cl. 64—30)

Given a rotary structure having an abutment and a clutch element spaced from each other axially of said structure, in combination with a clutch element revolubly mounted on said structure between said abutment and first-named clutch element and adapted to be urged toward and coact with the latter, this invention consists in novel means located between said abutment and second-named element for urging the latter toward the first-named element whereby, when one of the parts formed by said structure and second-named element is driven, the other may be driven therefrom.

The invention is particularly applicable (especially in the case in which the two clutch elements are of the friction type) where one of the parts formed by said structure and second-named element is adapted to rotate a wound mass, as of sheet material, to be formed and the other is driven at constant speed in that it makes it possible for the attendant to reduce the friction grip of said structure and second-named element on each other from time to time with the purpose of preventing the material from being unduly tensioned between such wound mass and means of some machine which has treated and is delivering the material at a given constant speed.

The invention is herein set forth as so applied, by way of example.

In the drawings,

Fig. 1 is a side elevation; and

Fig. 2 a plan, largely in section in the plane of the two shafts 3, showing my invention as so applied.

Let 1 and 2 be parts of a frame or supporting structure.

In the part 1 is journaled a shaft 3 to which at 3a may be coupled the beam (not shown) on which to wind the sheet material. On shaft 3 is splined a clutch-device 4, here of the claw type, which may be moved by any shifter (not shown) into clutching engagement with a clutch-device 5 freely rotative on the shaft and formed with a sprocket-wheel 5a and around which extends an endless chain 7.

The chain here also extends around the sprocket-wheel portion 6a of a clutch element 6, being the second-named clutch element revolubly mounted on the rotary structure above referred to.

Said structure comprises a shaft 8 journaled in the part 2 of the frame, a clutch element 9 keyed thereon at 9a and, as will appear, a nut 15. The clutch element 6 is journaled on the shaft portion of said structure.

In the present adaptation there is splined on the shaft at 10a a clutch-device 10 which is here in two parts with springs 10b between them, but of course this is immaterial.

The means for urging element 6 toward clutch element 9 of said rotary structure and here holding it in slip-friction contact with said element (since their clutching action in the present instance is of the friction type) is as follows:

Outward of clutch-device 10 there is arranged on the shaft 8 a member with respect to which said structure is free to revolve, the shaft penetrating said member. This member comprises a sleeve 11, externally threaded, as at 11a, and a bracket formed by a disk 12 which is affixed to the sleeve by screws 13 and depends, as at 12a, being formed with bearings 12b. Said member is confined against axial displacement, here by having a ball-bearing assembly 14 between it and the shaft, such assembly being itself confined against such displacement by a shoulder 8a on the shaft and a nut 15 screwed on the latter and which forms the mentioned abutment.

The threading 11a of said member 11—12 is engaged by the internal threading of a nut 16, here formed with concentric external gear-teeth 16a, or as a worm-wheel. This may have a ball-bearing assembly 17 between it and the shaft 8, which penetrates said member and may rotate independently thereof, and by its said ball-bearing assembly such member may act thrustwise, through clutch-device 10, on clutch element 6, i. e., when member 16 is turned relatively to member 11—12.

Supported by member 11—12 is means, geared with member 16, to rotate the latter. In the present instance this consists of a worm 18 journaled in the bearings 12b and formed on the end of a shaft 19 having a hand-wheel 20. The shaft may be held and thus hold the member 11—12 in a definite axial relation to the rotary structure by any means, as a bracket 21 supported on the shaft 3.

If shaft 19 and hence its worm be turned the member 16 will be rotated nut-fashion on member 11—12 and according to its direction of rotation it will either act to urge clutch element 6 toward clutch element 9 or counterwise, in the present instance either increasing or decreasing the friction between them, respectively.

Essentially stated, the invention may be stated as mechanism comprising the following: Rotary coaxial clutch-elements, 8—9 here constituting one and 6 the other clutch-element and one of them (as here the element 6) being urgeable in one direction lengthwise of their common axis into clutching coaction with the other; an abutment member, as 11—12, confined against movement in the opposite direction; a unitary thrust member, as 16, displaceable in the first direction to urge said urgeable element into clutching coaction with the other element and revoluble independently of said abutment member, said members having co-engaging threading coaxial with said clutch-elements, and a unitary device, as 18—19, supported on one and engaging the other member, for rotating the thrust member around said axis and relatively to the abutment member.

In the winding of sheet material assume a beam onto which such material is to be wound is fixed to or otherwise made to rotate with shaft 3, thus forming a core therefor. At the start of the winding, when the peripheral speed of the wound mass approximates the speed at which the material is being delivered for such winding, worm 18 is rotatively positioned so as to cause member 16 to exert such thrust on clutch-device 10 that the maximum friction will exist between clutch element 9 and clutch-device 10 on the one hand, and clutch element 6 on the other. As the mass increases in diameter the attendant from time to time may turn the member 16 by means of the worm to reduce the friction and hence increase the slippage possible as between parts 9 and 10 and clutch element 6.

The worm when extended to provide a shaft, as 19, constitutes means for confining member 11—12 against rotation, and this may of course be held in other angular positions than that shown. Hence the mechanism is adapted to various environments and other conditions affecting the machine or equivalent by which the sheet material is being delivered.

Having thus fully described my invention what I claim is:

1. Mechanism of the class described including in combination, with a rotary structure comprising an axially elongated portion and a fixed clutch-element thereon and with a clutch-element revoluble on said portion and movable into clutching engagement with the first clutch-element, an abutment member on said portion confined against displacement from the first clutch-element and between which and the latter the second clutch-element is arranged, a unitary thrust member arranged on said portion between the abutment member and the second clutch-element and displaceable axially of said portion to urge the second clutch-element into clutching engagement with the first clutch-element, said members having co-engaging threading coaxial with said portion and one being revoluble relatively to the other and having gear teeth in a series concentric with, and each extending parallel with the axis of, said portion, and a gear device journaled in the other member and geared with the teeth of the member having such teeth.

2. Mechanism of the class described including in combination, with a rotary structure comprising an axially elongated portion and a fixed clutch-element thereon and with a clutch-element revoluble on said portion and movable into clutching engagement with the first clutch-element, an abutment member on said portion confined against displacement from and having a sleeve concentric with said portion and projecting toward the first clutch-element and between which and the latter the second clutch-element is arranged, a nut member on said sleeve displaceable axially toward the second clutch-element to displace the same into clutching engagement with the first clutch-element, said members having co-engaging threading coaxial with said portion and one being revoluble relatively to the other and having gear teeth in a series concentric with, and each extending parallel with the axis of, said portion, and a gear device journaled in the other member and geared with the teeth of the member having such teeth.

CLIFFORD H. RAMSEY.